(12) United States Patent
Buerkle et al.

(10) Patent No.: US 9,050,890 B2
(45) Date of Patent: Jun. 9, 2015

(54) VEHICLE POSITIONING SYSTEM

(71) Applicant: DEERE & COMPANY, Moline, IL (US)

(72) Inventors: Bryan K. Buerkle, Cedar Falls, IA (US); Christopher A. Myers, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 84 days.

(21) Appl. No.: 13/967,810

(22) Filed: Aug. 15, 2013

(65) Prior Publication Data

US 2015/0047918 A1    Feb. 19, 2015

(51) Int. Cl.
 *B60K 26/00*  (2006.01)
 *B60D 1/36*  (2006.01)

(52) U.S. Cl.
 CPC .. *B60K 26/00* (2013.01); *B60D 1/36* (2013.01)

(58) Field of Classification Search
 CPC .................................. B60K 26/00; B60D 1/36
 USPC ................ 180/321, 322, 323, 53.2, 53.3, 320
 See application file for complete search history.

(56) References Cited

U.S. PATENT DOCUMENTS

| | | | |
|---|---|---|---|
| 5,120,187 A * | 6/1992 | Weber | 414/694 |
| 5,190,118 A | 3/1993 | Yelton | |
| 5,636,552 A * | 6/1997 | Richardson | 74/544 |
| 5,931,252 A | 8/1999 | Shimizu et al. | |
| 6,015,019 A | 1/2000 | Grimes et al. | |
| 6,030,169 A * | 2/2000 | Rossow et al. | 414/680 |
| 7,726,424 B2 * | 6/2010 | Hollenbeck et al. | 180/53.4 |
| 8,322,482 B2 | 12/2012 | Sprinkle et al. | |

FOREIGN PATENT DOCUMENTS

| | | |
|---|---|---|
| EP | 2433482 A1 | 3/2012 |
| JP | H07184406 A | 7/1995 |

OTHER PUBLICATIONS

European Search Report issued in counterpart of 14179068.3, dated Dec. 22, 2014 (7 pages).

* cited by examiner

*Primary Examiner* — Faye M Fleming

(57) ABSTRACT

A vehicle includes an operator station, a propulsion system, a steering system a hitch, and a vehicle positioning system. The positioning system includes positioning controls outside the operator station of the vehicle and adjacent to the hitch, such as on a rear fender. The positioning controls include a forward switch, a reverse switch, a left switch and a right switch. A controller is connected to the positioning controls, to the propulsion and steering systems. The controller moves the vehicle forward or rearward in response to actuation of the forward or reverse switches. The controller operates the steering system in response to actuation of the left or right switches. The steering system may include a brake control valve which brakes one of a pair of driven wheels while the other driven wheel is rotating. The steering system may include a steering control valve which is operable to turn steerable wheels.

8 Claims, 3 Drawing Sheets

VEHICLE POSITIONING SYSTEM

FIELD OF THE INVENTION

The present disclosure relates to a positioning system for a tractor or other work vehicle for use in connecting the tractor or vehicle with an implement or trailing attachment.

BACKGROUND OF THE INVENTION

Connecting a tractor to an implement with a clevis and hitch pin can sometimes be time consuming if the tractor and implement are not aligned. Often, an operator must visually check for the alignment which requires him/her to exit the vehicle and make this determination. If not aligned, the tractor must be repositioned to accordingly. Sometimes, the two are slightly misaligned wherein the pin does not properly seat. In situations such as this, the operator may have to again reposition the tractor. It would be beneficial to provide tractors with a system to manipulate the tractor from the ground near the hitch to allow the hitch pin to drop into place.

A tractor positioning system is described in U.S. Pat. No. 8,322,482. This system includes positioning controls outside of an operator station of the tractor that can be actuated by an operator while maintaining contact with the tractor to move the tractor forward or reverse to connect an implement. There is a needed which lets an operator steer as well as move the tract forward and reverse.

SUMMARY

According to an aspect of the present disclosure, a vehicle, such as an agricultural tractor, includes an operator station, steerable wheels, a pair of driven wheels and a propulsion system which may include an infinitely variable transmission. The tractor may also include an electro-hydraulic steering control valve for turning the steerable wheels, and an electro-hydraulic brake control valve for braking at least one of the driven wheels. The vehicle also includes a hitch and a rear fender adjacent to the hitch. Positioning controls are located on the rear fender. The positioning controls include a forward switch, a reverse switch, a left switch and a right switch. A controller is electrically connected to the switches, to the propulsion system, to the steering control valve and to the brake control valve. The controller moves the vehicle forward in response to actuation of the forward switch, and moves the vehicle rearwardly in response to actuation of the reverse switch. The controller may cause the steering control valve to turn the steerable wheels in response to actuation of one of the left and right switches. The controller may cause the brake control valve to brake one of the driven wheels in response to actuation of one of the left and right switches.

According to another aspect of the present disclosure, an agricultural tractor has electro-hydraulic brake controls, and a multi-position switch or control device is installed outside the vehicle cab, such as a fender, to allow an operator to accurately position and align a tractor drawbar or hitching device by manipulating the control device to very slowly and precisely move the tractor. Upon discovering that a tractor hitch is not aligned with the implement tongue, an operator can perform minute adjustments outside the tractor cab by operating the electro-hydraulic brake controls with the control device.

DETAILED DESCRIPTION OF THE DRAWINGS

Figure 1:
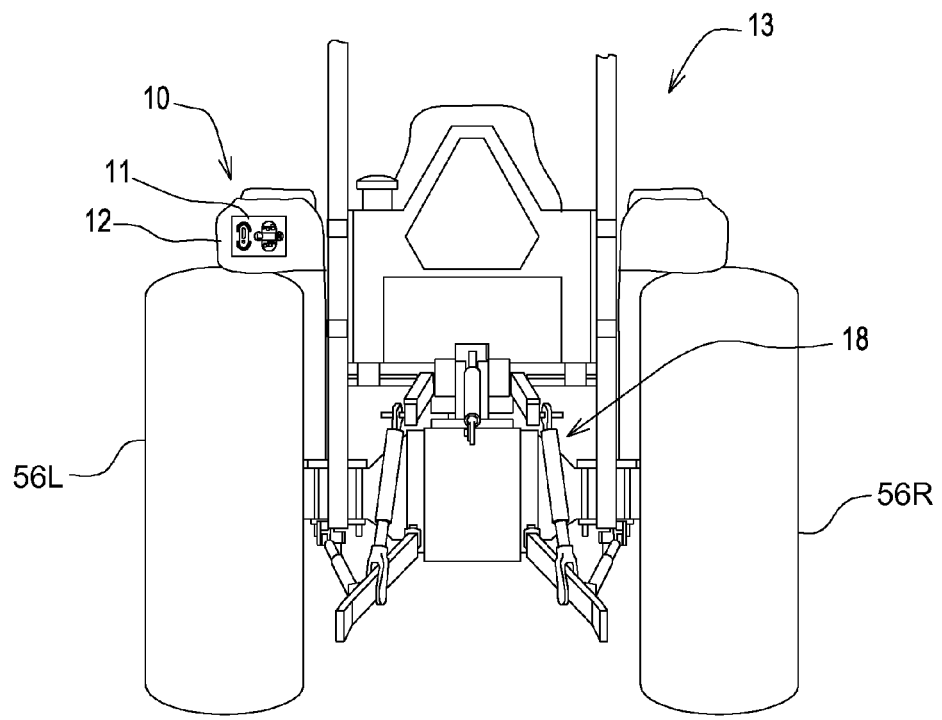
FIG. 1 is a rear view of a tractor with a positioning system according to one embodiment of the invention.
Figure 2:
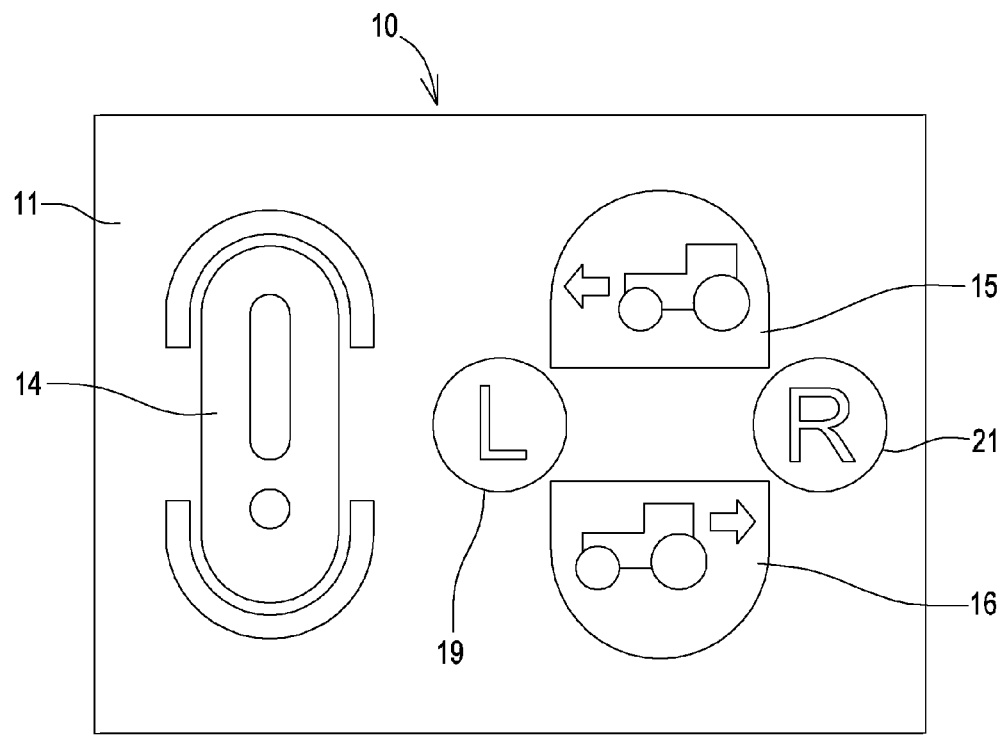
FIG. 2 is a rear view of controls for a tractor positioning system according to one embodiment of the invention.

Referring to FIGS. 1 and 2, a tractor positioning system 10 may include positioning controls 11 located on the outer surface of the tractor 13 outside the operator station. For example, the positioning controls 11 may be located at the rear of the tractor 13, preferably on a fender 12 or other outer surface within reach of an operator who is standing on the ground while he or she also can reach the tractor's three point hitch 18. While on the ground, the operator may actuate the positioning controls 11 to move the tractor 13 slowly over short distances into position for connecting an implement (not shown) to the tractor 13. The positioning controls 11 are mounted on a location on the tractor 13 where implement attachment is done. The controls 11 allow the operator to move the tractor 13 while he or she is in close proximity to the task being performed.

The positioning controls 11 include a forward switch 15, a reverse switch 16, a left switch 19 and a right switch 21. The switches 15, 16, 19 and 21 are preferably normally off, push-button type switches. The positioning controls 11 may be any switch, button or other momentary contact that an operator must continuously press to remain actuated. Only one of the forward switch 15 and reverse switch 16 may be actuated at a given time. Only one of the left switch 19 and right switch 21 may be actuated at a given time. For example, the forward and reverse switches 15, 16 may be configured as a toggle switch with a spring to return to a neutral position, when neither switch is actuated. Also, the left and right switches 19, 21 may be configured as a toggle switch with a spring to return to a neutral position, when neither switch is actuated.

Figure 3:
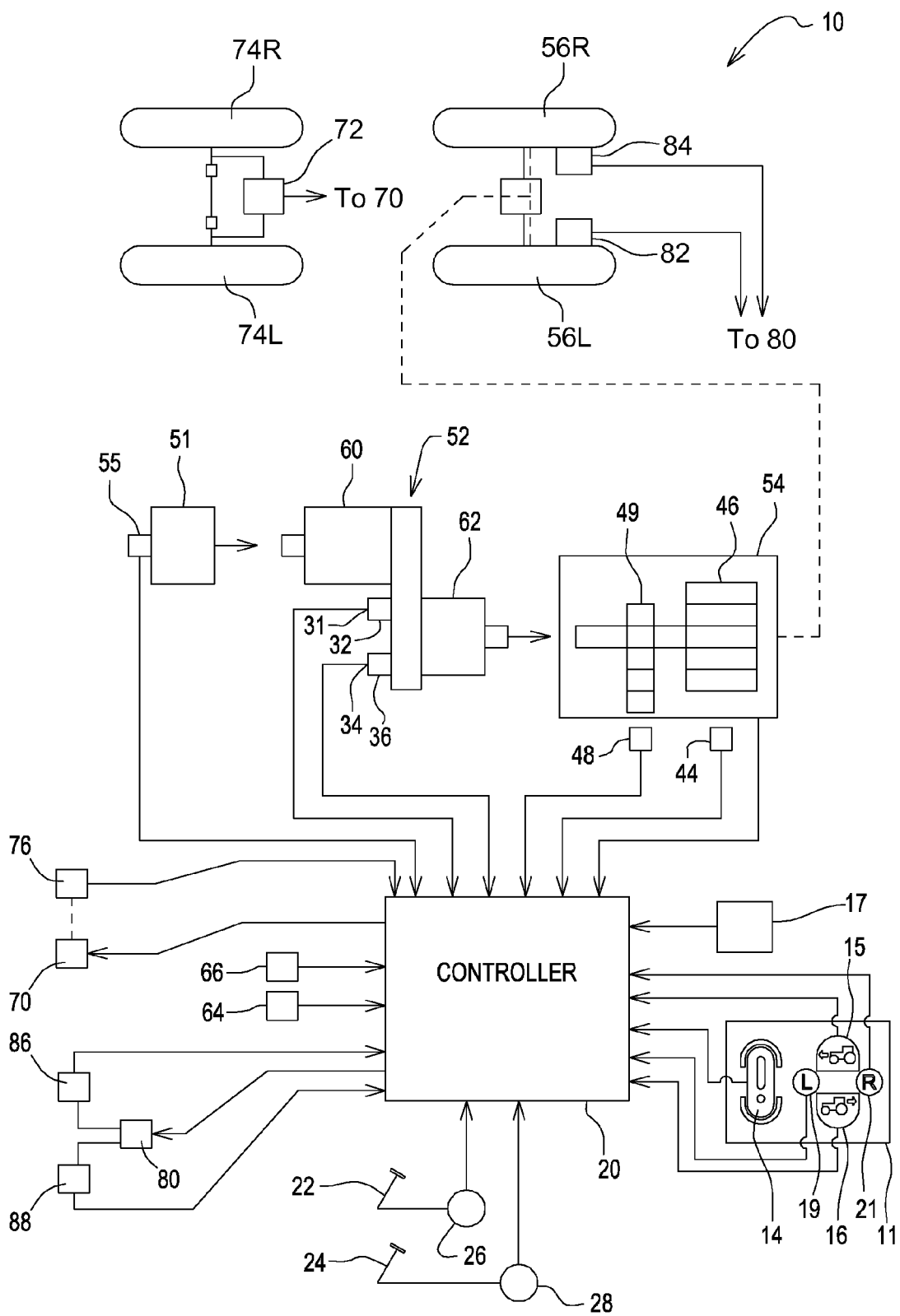
FIG. 3 is a schematic block diagram of a tractor positioning system according to one embodiment of the invention.

Referring now to FIG. 3, tractor positioning system 10 may be used with a tractor having a propulsion system which includes an engine 51 which rotationally drives hydrostatic transmission 52. The hydrostatic transmission may include variable displacement hydrostatic pump 60 and hydraulic motor 62. The hydrostatic transmission may drive a multi-speed gear transmission 54, for transmitting power to one or more driven or traction wheels 56L and 65R. The tractor speed may be controlled by adjustment of the speed output of the hydrostatic transmission 52.

For normal operation of the tractor from the operator station, the operator may use forward pedal 22 and reverse pedal 24. The forward pedal may be operatively engaged with potentiometer 26 to produce a forward pedal position signal, and the reverse pedal may be operatively engaged with potentiometer 28 to produce a reverse pedal position signal. The potentiometers may be signal-connected to electronic controller 20.

An electronic controller 20, such as a microprocessor-based microcontroller, may be signal-connected, through signal conditioning or amplifying circuitry, to solenoid 31 of forward drive proportional pressure control valve 32 and to solenoid 34 of reverse drive proportional pressure control valve 36. The output current to energize the forward or reverse pressure control valves may be substantially proportional to the corresponding position signals from the forward and reverse pedals respectively.

Before operating the tractor positioning system, the controller must determine that at least one or more system checks are satisfied. For example, the system checks may be in the form of switches or electronic signals that controller 20 may receive from other devices on the tractor. For example, the system checks may require seat switch 64 to detect the absence of a seated operator at the operator station of the tractor. In other words, the positioning system may not be actuated to move the tractor if an operator is seated at the operator station. The system checks also may include park brake switch 66 to detect the park brake is engaged. The park brake also may remain engaged while the positioning system causes the tractor to move slowly in forward or reverse. Additionally, the system checks may require forward pedal 22 and reverse pedal 24 to be at home, and not be actuated. The system checks may require the speed of engine 51 to be under a specified value such as 1200 rpm. The system checks may require transmission 54 to be in a specified low range such as the "A" range. The system checks may require one or more speed sensors 44, 48 to be working and operational, and may require the ground speed of the tractor to be zero. Thus, the controller may not permit the positioning controls to cause the transmission or other device to move the tractor in forward or reverse at the desired ground speed until and unless one or more system checks are and remain satisfied.

The system 10 may include a conventional electro-hydraulic steering control valve 70 which is controlled by the controller 20. The steering control valve 70 controls a conventional steering actuator 72 which turns the steerable wheels 74L and 74R, and a steering sensor 76 provides a steering angle signal to the controller 20.

The system 10 also may include a conventional electro-hydraulic brake control valve 80 which is controlled by the controller 20. The brake control valve 80 controls the left and right brakes 82 and 84 for the driven wheels 56L and 56R. A left brake sensor 86 provides a left brake signal to the controller 20, and a right brake sensor 88 provides a right brake signal to the controller 20.

Figure 4:
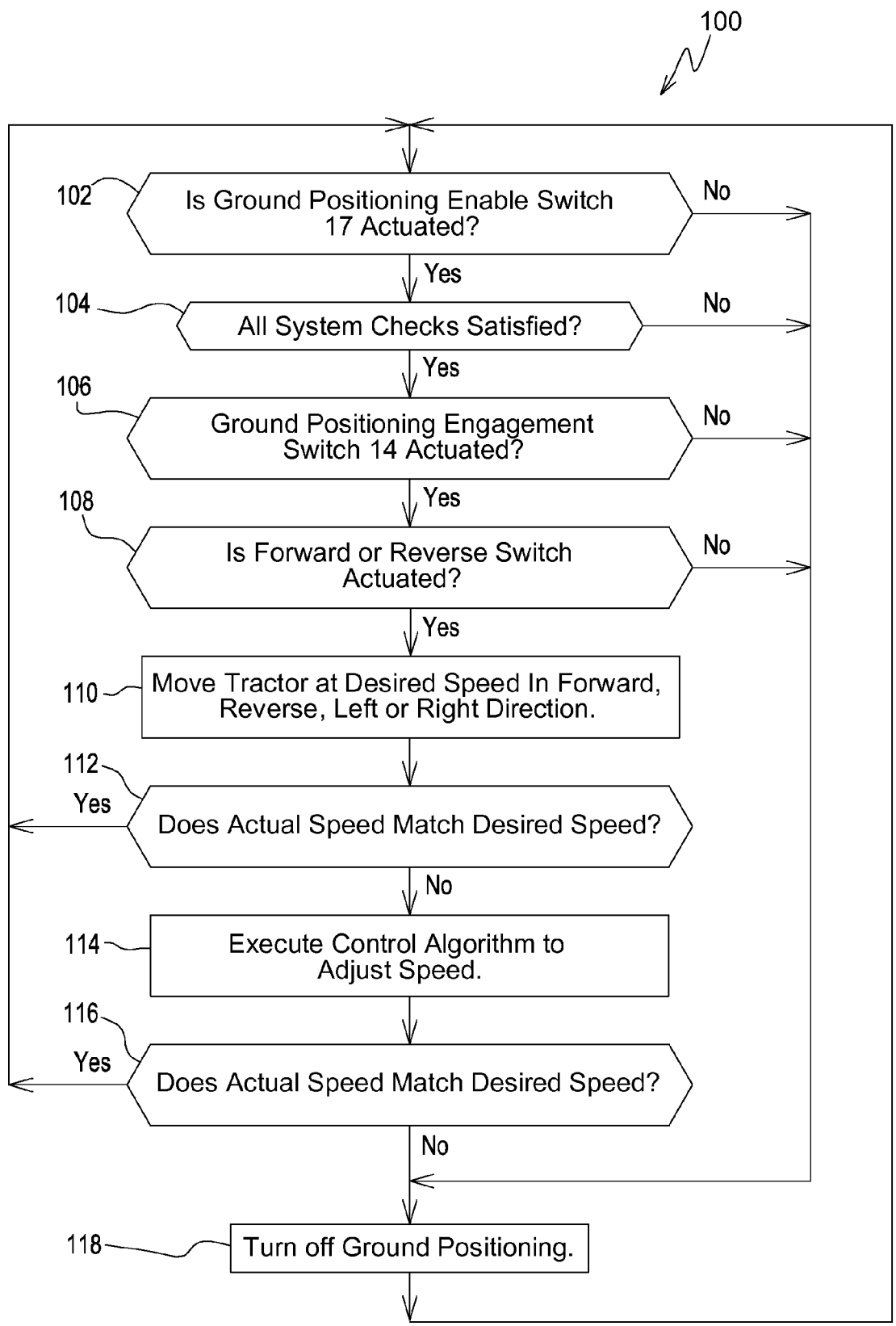
FIG. 4 is a flow chart of an algorithm performed by the system of FIG. 3.

The controller 20 executes an algorithm 100 represented by FIG. 4. The conversion of this flow chart into a standard language for implementing the algorithm described by the flow chart in a digital computer or microprocessor, will be evident to one with ordinary skill in the art.

In step 102, the controller 20 may determine if the positioning enable switch 17 in the operator station of the tractor 13 is actuated.

If the positioning enable switch 17 is actuated, then in step 104 the controller may determine if one or more system checks are satisfied.

If the system checks are satisfied, then in step 106 the controller may determine if the positioning engagement switch 14 is actuated at the rear of the tractor 13.

If the positioning engagement switch 14 is actuated, then in step 108 the controller may determine if either the forward, reverse, left or right switch at the rear of the tractor is actuated.

In step 110, if the forward or reverse switch is actuated, the controller 20 commands the propulsion system to move the tractor 13 in forward or reverse and left or right at the desired speed. Also in step 110, in response to manipulation of one of the left and right switches 19 and 21, the controller 20 will cause the electrohydraulic brake control 74 to brake one of the traction wheels 56L or 56R while the propulsion system rotates the opposite wheel. This will cause the tractor 13 to pivot slightly using the braked traction wheel as a fulcrum or pivot point effecting an arcuate movement of the hitch 18 to align with the implement (not shown) in order to install and secure a hitch pin.

If the tractor 13 includes an electro-hydraulic steering control valve 70, then the controller 20 can also turn the tractor steerable wheels 74L and 74R to assist in the left to right movement in response to manipulation of one of the left and right switches 19 and 21. This can be done either while stationary or while the tractor 13 is commanded to move forward reverse by the forward or reverse switches 15 or 16. Preferably, the controller 20 will include limits which will determine at what point a directional command (left or right) causes both a braking of a single wheel 65L or 56R and a steering angle change of the steerable wheels 74L and 74R to be performed. Optionally, the controller also may trigger an audible warning and/or a short delay time before commanding the tractor to move in forward or reverse.

In step 112 the controller then may determine if the actual ground speed of the tractor detected by a first sensor matches the desired speed.

If it does not match the desired speed, in step 114 the controller may adjust the speed. For example, a PID control algorithm (not shown), or other similar control algorithm, may be used to adjust the actual speed toward the desired speed.

In step 116, the controller then may determine if the actual ground speed detected by a second sensor matches the desired speed. If it does not match the desired speed, the controller may turn off in positioning system in step 118. For example, the controller may command the transmission to move to a neutral position. Alternatively, the controller may kill the engine by various means such as shutting off fuel flow with a solenoid, or grounding the engine ignition.

During operation of the tractor positioning system 10, the controller 20 may monitor the status of the positioning enable switch 17 in the operator's station, one or more system checks, the positioning engagement switch 14, and the forward, reverse, left and right switches 15, 16, 19, 21 at the rear of the tractor. If none of the switches are actuated, or any of the system checks are not satisfied, the controller may turn off positioning as shown in step 118.

Alternatively, positioning system 10 may be used with a tractor or vehicle having one or more electric wheel motors instead of a hydrostatic transmission. The operator may actuate the positioning controls at the rear of the tractor, causing the controller to provide speed commands to each electric wheel motor to rotate at the desired speed, and to provide steering commands to the vehicle steering system. In another alternative embodiment, the positioning system may be used with a directional reversing transmission that uses electronically controlled forward and reverse clutches, by modulating current to the traction clutches while the transmission is in the lowest gear.

To move the tractor 13 using the positioning system, the operator must continuously actuate the positioning controls 11 which require the operator to remain in direct contact with the controls 11 on the tractor 13. The operator may actuate these controls 11 while standing near the rear of the tractor 13, after exiting the operator station. If the operator discontinues contact with the controls 11 on the tractor 13, the positioning system will cause the tractor 13 to stop moving.

An operator may actuate either of switches 15, 16, 19 or 21 to move the tractor 13 slowly forward, backward, left or right into a position where he or she can connect an implement to the three point hitch of the tractor 13. The positioning system is supplemental to the operator station controls, and may be used for moving the tractor 13 for short distances, typically less than about 0.5 meters. Although the positioning controls in a preferred embodiment are located at the rear of the tractor 13, the controls also may be mounted at the front of the tractor 13 for the purpose of moving the tractor 13 a short distance in position to connect an implement to a front three point hitch.

The ground speed of the tractor 13 when operating the positioning system may be fixed at a desired speed of below about 25 mm per second and preferably about 10 mm per second. For example, the positioning system may specify and set the ground speed of the tractor 13 below any speed normally attainable by the operator using the pedals in the operator station. Alternatively, the ground speed with the positioning system may be variable from zero up to a preset maximum safe speed for positioning while the operator is off the tractor 13. The maximum allowable speed may be independent of engine speed, or of range transmission gear selection.

The ground speed of the tractor 13 may be sensed by one or more Hall effect sensors which provide feedback signals to controller 20 so that the selected speed is maintained regardless of the range transmission gear selection or engine speed. For example, the desired ground speed may be variable between a minimum speed of zero and a maximum of not more than about 25 millimeter per second.

Forward and reverse switches 15, 16 may be moved by the operator to actuate a speed limiting potentiometer (not shown) that is signal connected to controller 20. The controller may be programmed to send a proportional speed signal, in response to, and proportional to, a signal from the speed limiting potentiometer, to the respective solenoid 31, 34, depending on which switch is actuated. The proportional speed signal may range from a zero speed signal up to the pre-programmed maximum speed signal corresponding to the maximum travel or position of the forward and reverse switches.

Alternatively, positioning controls 11 also may include engagement switch 14 which the operator must engage at the same time as the forward or reverse switch while he or she is out of the operator station. The proportional speed signal may range from a zero speed signal up to the pre-programmed maximum speed signal corresponding to the maximum travel or position of the engagement switch.

The positioning system 10 may include one or more speed sensors. For example, first rotation speed sensor 44, such as a Hall effect sensor, may be arranged adjacent a rotating part of range transmission, such as gear 46 that rotates in direct proportion to the vehicle ground speed. Controller 20 may receive a frequency signal from sensor 44 indicating the actual speed, and compare it to the desired speed. If the actual speed is not the same as the desired speed, the controller then may adjust the output speed signal to the proportional pressure reducing valve solenoids 30, 34 using a PID control algorithm to reach the desired speed. Alternatively, other control algorithms may be used to reach or approach the desired speed.

Optionally, second rotation speed sensor 48 may be arranged adjacent another rotating part of the range transmission, such as gear 49 that also may rotate in direct proportion to the vehicle ground speed. The second rotation speed sensor may be used to verify that the actual ground speed is not different from the desired speed. For example, if the second rotation speed sensor indicates a difference, the controller may provide a command to engine controller or ignition module 55 to discontinue operation of the tractor 13 positioning system or stop the engine.

Alternatively, ground speed detection and feedback may be accomplished by a hydrostatic pump displacement control system (not shown). This control system may control the angle of the swash plate of the hydrostatic pump using an angle sensor, which may be indicative of the tractor 13 ground speed.

Additionally, the positioning system 10 may be enabled by enable switch 17 located in the operator station of the tractor 13. Controller 20 may include logic requiring the operator to actuate the enable switch in the operator station before actuating any of the positioning controls at the rear of the tractor 13. Additionally, while the operator is actuating the positioning controls at the rear of the tractor 13, the system may disable the controls in the operator station including the forward and reverse pedals. After the operator discontinues actuating the positioning controls, the controls in the operator station then may be used. The operator station controls may disable the positioning controls.

The control device can also be used to advance or reverse the tractor position within a distance using sensors or timers to assure safety. Additionally, the control system could also be integrated with a suspension systems used on modern tractors. In this arrangement, the operator could affect a side-to side or fore-aft positioning, shaking or rocking motion of the tractor to cause a misaligned hitch pin to drop into place. An alternative to having a fender mounted device would be to provide a hand-held device similar to those used to remotely operate lifting devices such as an overhead crane. With the advances in wireless technologies, a device of this nature could be operated from many locations.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. In a vehicle having an operator station, a propulsion system, a steering system and a hitch, a vehicle positioning system comprising:
    positioning controls on the vehicle outside the operator station of the vehicle and adjacent to the hitch, the positioning controls including a forward switch, a reverse switch, a left switch and a right switch; and
    a controller electrically connected to the positioning controls and connected to the propulsion and steering systems, the controller moving the vehicle forward in response to actuation of the forward switch, the controller moving the vehicle rearwardly in response to actuation of the reverse switch, the controller steering the vehicle left in response to actuation of the left switch, and the controller steering the vehicle right in response to actuation of the right switch.

2. The vehicle positioning system of claim 1, wherein:
    the steering system comprises a brake control valve which is operable to brake one of a pair of driven wheels while the other driven wheel is rotating.

3. The vehicle positioning system of claim 1, wherein:
    the steering system comprises a steering control valve which is operable to turn steerable wheels.

4. The vehicle positioning system of claim 1, wherein:
    the steering system comprises a brake control valve which is operable to brake a one of a pair of driven wheels while the other drive wheel is rotating, and a steering control valve which is operable to turn steerable wheels.

5. In a vehicle having an operator station, steerable wheels, a propulsion system, a steering system, a hitch and a rear fender adjacent to the hitch, a vehicle positioning system comprising:
  a forward switch, a reverse switch, a left switch and a right switch, all of said switches being positioned on the rear fender; and
  a controller electrically connected to said switches and connected to the propulsion and steering systems, the controller moving the vehicle forward in response to actuation of the forward switch, the controller moving the vehicle rearwardly in response to actuation of the reverse switch, the controller turning the steerable wheels in response to actuation of the left switch, and the controller turning the steerable wheels in response to actuation of the right switch.

6. The vehicle positioning system of claim 5, wherein:
  the vehicle includes a pair of driven wheels; and
  the steering system comprises a brake control valve which is operable to brake a one of a pair of driven wheels while the other drive wheel is rotating, and the controller, in response to actuation one of the left and right switches, actuating the brake control valve to brake a corresponding one of the driven wheels.

7. In a vehicle having an operator station, steerable wheels, a pair of driven wheels, a propulsion system, a steering control valve for turning the steerable wheels, a brake control valve for braking at least one of the driven wheels, a hitch and a rear fender adjacent to the hitch, a vehicle positioning system comprising:
  a forward switch, a reverse switch, a left switch and a right switch, all of said switches being positioned on the rear fender; and
  a controller electrically connected to said switches, connected to the propulsion system, connected to the steering control valve and connected to the brake control valve, the controller moving the vehicle forward in response to actuation of the forward switch, the controller moving the vehicle rearwardly in response to actuation of the reverse switch, the controller causing the steering control valve to turn the steerable wheels in response to actuation of one of the left and right switches, and the controller causing the brake control valve to brake one of the driven wheels in response to actuation of one of the left and right switches.

8. In a vehicle having an operator station, a propulsion system, a steering system and a hitch, a vehicle positioning system comprising:
  positioning controls remote from the operator station of the vehicle, the positioning controls including a forward switch, a reverse switch, a left switch and a right switch; and
  a controller electrically connected to the positioning controls and connected to the propulsion and steering systems, the controller moving the vehicle forward in response to actuation of the forward switch, the controller moving the vehicle rearwardly in response to actuation of the reverse switch, the controller steering the vehicle left in response to actuation of the left switch, and the controller steering the vehicle right in response to actuation of the right switch.

* * * * *